(12) United States Patent
Ballance

(10) Patent No.: US 9,417,822 B1
(45) Date of Patent: Aug. 16, 2016

(54) INTERNAL STORAGE MANAGER FOR RAID DEVICES

(71) Applicant: Western Digital Technologies, Inc., Irvine, CA (US)

(72) Inventor: Gary E. Ballance, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 346 days.

(21) Appl. No.: 13/837,586

(22) Filed: Mar. 15, 2013

(51) Int. Cl.
*G06F 13/00* (2006.01)
*G06F 3/06* (2006.01)

(52) U.S. Cl.
CPC ............ *G06F 3/0689* (2013.01); *G06F 3/0637* (2013.01)

(58) Field of Classification Search
CPC ... G06F 3/0602; G06F 3/0614; G06F 3/0628; G06F 3/0644; G06F 3/0689; G06F 12/0238; G06F 12/0623; G06F 12/0646
USPC ........ 711/114, 152, 154, 170; 710/10, 33, 62, 710/65, 308; 712/15, 42, 248; 360/98.01, 360/135, 264
See application file for complete search history.

(56) References Cited

U.S. PATENT DOCUMENTS

| | | | |
|---|---|---|---|
| 6,516,425 B1 * | 2/2003 | Belhadj et al. ............... | 714/6.12 |
| 7,418,548 B2 | 8/2008 | Corrado et al. | |
| 7,617,361 B2 * | 11/2009 | Hart ............................. | 711/114 |
| 7,814,273 B2 | 10/2010 | Barrall | |
| 8,626,820 B1 * | 1/2014 | Levy ............................. | 709/201 |
| 2003/0120869 A1 * | 6/2003 | Lee et al. ...................... | 711/135 |
| 2003/0231529 A1 * | 12/2003 | Hetrick ............... | G06F 11/1092 365/200 |
| 2006/0112222 A1 * | 5/2006 | Barrall ......................... | 711/114 |
| 2007/0094470 A1 * | 4/2007 | Haustein et al. .............. | 711/163 |
| 2007/0143541 A1 * | 6/2007 | Nichols ............... | G06F 11/1084 711/114 |
| 2007/0233949 A1 * | 10/2007 | Hart ............................. | 711/114 |
| 2007/0266037 A1 | 11/2007 | Terry et al. | |
| 2008/0168209 A1 * | 7/2008 | Davison ......................... | 711/6 |
| 2009/0210619 A1 * | 8/2009 | Mukker et al. ................ | 711/114 |
| 2009/0271659 A1 * | 10/2009 | Troppens et al. ................ | 714/7 |
| 2010/0138603 A1 * | 6/2010 | Mukker ........................ | 711/114 |
| 2010/0153640 A1 * | 6/2010 | Jagadish et al. ............... | 711/114 |
| 2010/0169571 A1 * | 7/2010 | Kamalavannan et al. .... | 711/114 |
| 2014/0089581 A1 * | 3/2014 | DeNeui ................ | G06F 3/0607 711/114 |
| 2014/0201480 A1 * | 7/2014 | Factor et al. .................. | 711/162 |

* cited by examiner

*Primary Examiner* — Reba I Elmore

(57) ABSTRACT

The present invention is directed to systems and methods for the automatic management of volumes, such as creation, migration, and rebuilding for redundant array of independent disks (RAID). The automated management is triggered upon the installation of a new drive in a network attached storage (NAS) device and proceeds according to a user-specified setting. The management is automatic in that user intervention would not be required or requested and would be triggered transparently upon the insertion of a new drive into the NAS device. The embodiments may be employed in other types of multi-drive devices, such as direct attached storage devices, storage area networks, external drives. In addition, the embodiments may be employed with different types of storage media, such as solid-state drives, hybrid drives, etc., in addition to hard disk drives.

24 Claims, 6 Drawing Sheets

INTERNAL STORAGE MANAGER FOR RAID DEVICES

BACKGROUND

A redundant array of independent disks (RAID) combines multiple drives into one or more logical volumes or shares. Depending on its configuration, a RAID can provide various levels of capacity and protection by using various schemes to divide and replicate the data across the multiple physical drives.

Unfortunately, RAID devices are complex and difficult to configure. For example, when a user adds drives to the RAID, they must be competent in specifying how the new drive fits within the current RAID scheme. Due to the numerous options available among RAID schemes, it can be difficult to correctly add or replace a drive. Accordingly, it would be desirable to provide a simplified method and system for maintaining a multi-drive storage device, such as network attached storage.

BRIEF DESCRIPTION OF THE DRAWINGS

Systems and methods which embody the various features of the invention will now be described with reference to the following drawings, in which.

DETAILED DESCRIPTION

The invention relates to the automatic management of volumes, such as creation, migration, and rebuilding for redundant array of independent disks (RAID). The automated management is triggered upon the installation of a new drive in a network attached storage (NAS) device and proceeds according to a simplified user-specified setting. The migration and rebuilding may also be triggered by a drive failure and replacement of the failed drive. The management is automatic in that user intervention would not be required or requested and would be triggered transparently upon the insertion of a new drive into the NAS device. The embodiments may be employed in other types of multi-drive devices, such as direct attached storage devices, storage area networks, and/or external drives. In addition, the embodiments may be employed with different types of storage media, such as solid-state drives, hybrid drives, etc., in addition to hard disk drives.

In some embodiments, a minimal range of simplified user-specified settings is provided to the user for the NAS. For example, the user may be offered settings that indicate the NAS should be configured for maximum reliability/redundancy or maximum capacity. The NAS interprets the simplified user-specified settings and determines the implementation details to accomplish the user's selection.

In some embodiments, the user may change the protection setting at various times. In response, the storage device will migrate the internal configuration of its array of drives without requiring further user input. During this migration, the storage device will continue to externally present the drives as a logical volume or share.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

An Exemplary System

Figure 1:
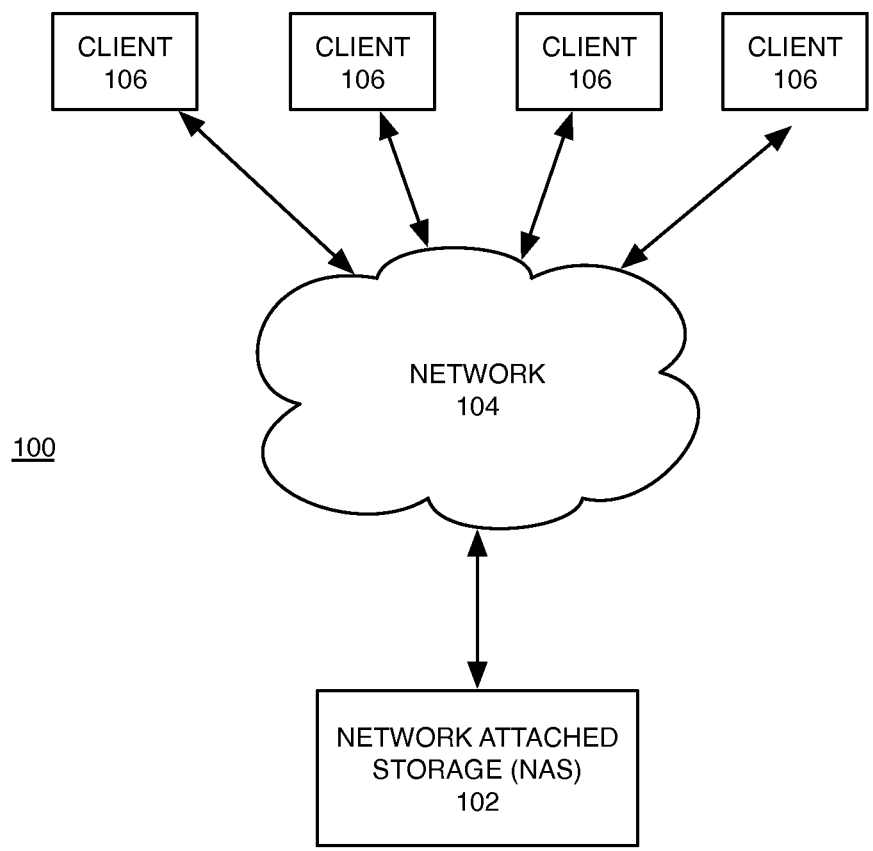
FIG. 1 shows an exemplary system of an embodiment of the present invention.

FIG. 1 shows an exemplary system of an embodiment of the present invention. For purposes of illustration, an exemplary system 100 is shown with a network attached storage (NAS) 102. The NAS 102 is coupled to a network 104 and one or more clients 106. These components will now be briefly described below.

The NAS 102 is file-level storage device that is capable of connecting to a network, such as network 104 and provides access to files stored in its storage medium as a file server. The NAS 102 provides access to its storage as a logical volume or share from its constituent storage devices (shown in FIG. 2). In one embodiment, NAS 102 is implemented with known hardware, software, and firmware. For example, in one embodiment, the NAS 102 is configured as an appliance having an embedded operating system. The NAS 102 may support a variety of operating systems, such as UNIX, LINUX, Windows, and the like. As will be further described, the NAS 102 may also comprise multiple storage media types, such as one or more hard disks that are arranged into a RAID. Furthermore, the NAS 102 may support various protocols, such as NFS, SMB/CIFS, AFP, etc.

Network 104 provides a communication infrastructure for data communications between the components of system 100. Network 104 may comprise known network elements, such as hubs, switches, routers, firewalls, etc., to facilitate and secure these communications. In the embodiments, the network 104 may comprise a local area network, a wide area network, etc. In addition, the network 104 may comprise wired and wireless links or components to carry its communications.

Clients 106 represent the various client devices that may store and/or access files on the NAS 102. For example, the clients 106 may be a desktop, a laptop, a tablet, a smart phone, etc. The embodiments support any device that can access a file stored on the NAS 102.

An Exemplary NAS

Figure 2:
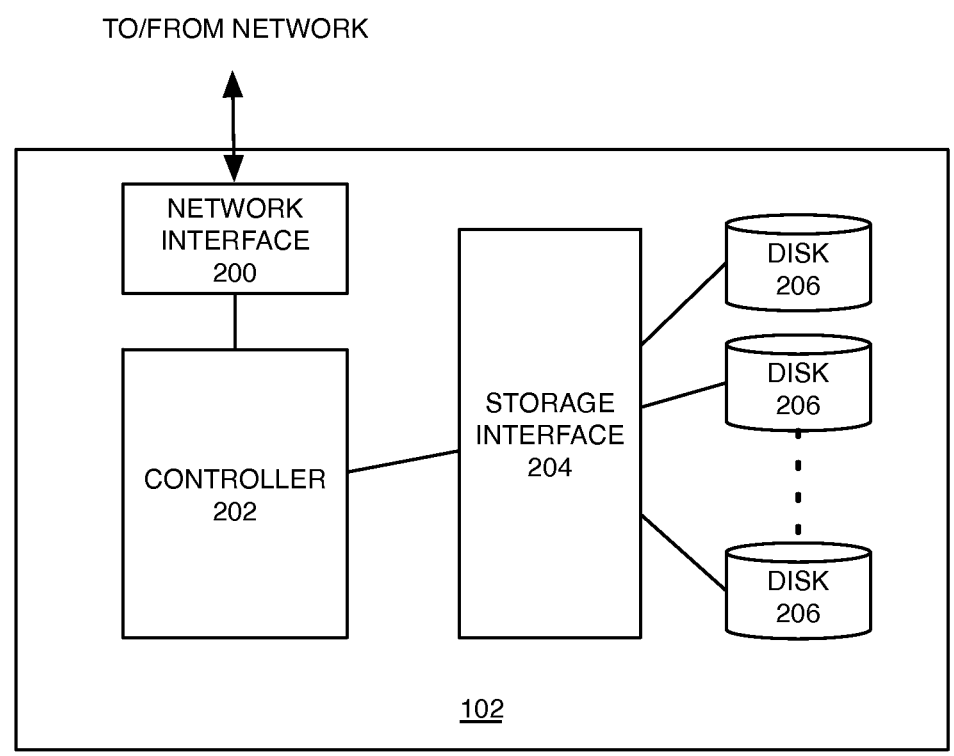
FIG. 2 shows an exemplary network attached storage with a RAID array in accordance with an embodiment of the present invention.

FIG. 2 shows an exemplary block diagram of a network-attached storage (NAS) 102 with a RAID in accordance with an embodiment of the present invention. The NAS 102 presents its storage array of disks 206 as a logical volume or share, which is accessible by clients 106. In one embodiment, the NAS 102 is configured to present the storage array of disk 206 as a single logical volume or share. Internally, however, the NAS 102 configures the storage array of disks 206 with a desired capacity or redundancy in response to the simplified user setting selected. As shown, the NAS 102 may comprise a network interface 200, a controller 202, a storage interface 204, and a storage array of disks 206. These components will now be briefly described below.

Network interface 200 serves as the network communications interface for the NAS 102. For example, in one embodiment, the network interface 200 may comprise one or more Gigabit Ethernet, Ethernet, USB, Wi-Fi, and/or other types of interfaces for communications with network 104. Such components are known to those skilled in the art.

Controller 202 represents the hardware and software that manages the disks 206 of the NAS 102 and presents them as a logical volume or share to the clients 106. In some embodiments, the controller 202 may also comprise one or more other components to supplement its operations, such as an on-chip RAID controller, a memory or disk cache, etc. For example, the controller 202 may comprise a hardware RAID controller, such as those provided by Intel Corporation.

Storage interface 204 serves as an interface between the controller 202 and the disks 206. The storage interface 204 may support various communications, such as SAS, SATA, SCSI, etc.

Disks 206 represent the storage medium and associated electronics for the devices storing data for the NAS 102. In one embodiment, the disks 206 may be implemented as hard disk drives, such as those provided by Western Digital Technologies, Inc. Of course, in other embodiments, the NAS 102 may comprise other types of storage media and devices, such as solid-state drives, hybrid drives, etc. Any type of storage drive that can be configured as part of a RAID may be implemented as part of an embodiment of the present invention.

Simplified RAID Configuration and Auto-Migration

In the embodiments, the storage device 102 is configured to offer a simplified setting to determine its behavior and migration of disks 206, while continuing to present disks 206 as a single logical volume or share to clients 106. For example, the storage device 102 may comprise a switch or toggle or setting via a user interface that offers a range of protection settings. In one embodiment, the setting for configuring the behavior of the storage device 102 is simplified to a small finite number, such as "Maximum Capacity" and "Maximum Protection." This protection setting may be selected via a graphical user interface provided by the storage device 102, a mechanical switch on the enclosure of storage device 102, or other form of instruction.

In one embodiment, the protection setting may be changed by the user at any time. In response, the controller 202 then determines a migration path for internally configuring disks 206 to achieve the desired setting. For example, the controller 202 may create one or more RAID volumes across the drives 206 to achieve a desired capacity or redundancy specified by the simplified user setting. Some examples of these migrations are explained further below. In this embodiment, the controller 202 performs the migration without requiring any user intervention and continues to present the disks 206 to the user as a single logical volume or share. Examples of how the controller 202 performs these migrations are further explained below.

In another embodiment, the protection setting is configured as a one-time only setting, which persists for the life of the storage device 102. In another embodiment, the protection setting may be revised depending on the operational conditions and/or special administrative rights or an override code.

In yet another embodiment, the controller 202 may be configured to migrate the volumes from one RAID level to another RAID level based on various operating conditions. For example, the controller 202 may migrate to a different protection setting subject to one or more thresholds or limits, such as <50% of drive capacity. Like the other embodiments, the controller 202 may perform this migration without requiring user input and without disrupting the logical volume or share presented to the user at clients 106, other than changing its size or redundancy.

Depending on the setting selected, the controller 202 of the storage device 102 arranges the disks 206 with different RAID schemes, such as one of RAID 0, 1, 2, 3, 4, 5, 6, or 10, or any hybrid thereof. In one embodiment, based on the setting selected, the controller 202 will map the setting into the appropriate RAID scheme based on the drives installed, their size, and number of volumes. For example, the controller 202 may map the protection setting to a RAID scheme to migrate the configuration of the drives 206 internally within the storage device 102. Of course, the storage device 102 continues to externally present the drives 206 as a single logical volume or share.

For purposes of illustration, various scenarios and the corresponding response of the controller 202 will now be described below.

Exemplary Internal Configuration and Migration

For purposes of illustration, the following examples assume that the storage device 202 offers a single storage setting that will indicate if storage is to utilize "Maximum Capacity" (no redundancy) or "Maximum Protection" (redundancy). When drives are inserted into a previously empty enclosure, the controller 202 will automatically create one or more internal volumes, which are presented externally as a single logical volume or share.

In general, when "Maximum Capacity" is selected, a single drive inserted will be created as a joined body of disks ("JBOD"). If multiple drives of the same size are inserted, then the controller 202 will create a RAID 0 volume and present the disks as a single logical volume. The logical volume will have a capacity equal to the aggregate of the drives inserted.

When "Maximum Protection" is selected, the first drive inserted will be created as a JBOD. However, in this embodiment, if two drives are inserted, the controller 202 will arrange the drives as a RAID 1 array. This results in a logical volume having more redundancy, but let less capacity. For example, if both drives are 1 terabyte ("TB") each, the logical volume presented would have a capacity available to the user of only 1 TB. If more than two drives are inserted, then the controller 202 may configure the drives as a RAID 5 array. In other words, the once a volume is redundant, adding additional drives does not increase the redundancy (just the capacity). Thus, for example, if four drives of 1 TB each were added to the storage device 102, then a maximum protection setting will result in a logical volume of 3 TB being presented to the user.

The tables below illustrate some of the basic migration paths that may be employed by storage device 102. For purposes of brevity, the table assumes that storage device 102 comprises 4 bays that can each accommodate a drive each having a capacity of X TB.

| Number of Drives or Extents Available | Maximum Capacity | | Maximum Protection | |
|---|---|---|---|---|
| | Internal Configuration | Logical Volume | Internal Configuration | Logical Volume |
| 1 Drive/Extent | JBOD | X TB | JBOD | X TB |
| 2 Drives/Extent | RAID 0 | 2X TB | RAID 1 | 2X TB |
| 3 Drives/Extent | RAID 0 | 3X TB | RAID 5 | 2X TB |
| 4 Drives/Extent | RAID 0 | 4X TB | RAID 5 | 3X TB |

In some embodiments, the controller 202 will attempt to follow the migration paths noted above as new drives are added or when the protection setting has been changed.

Figure 3:
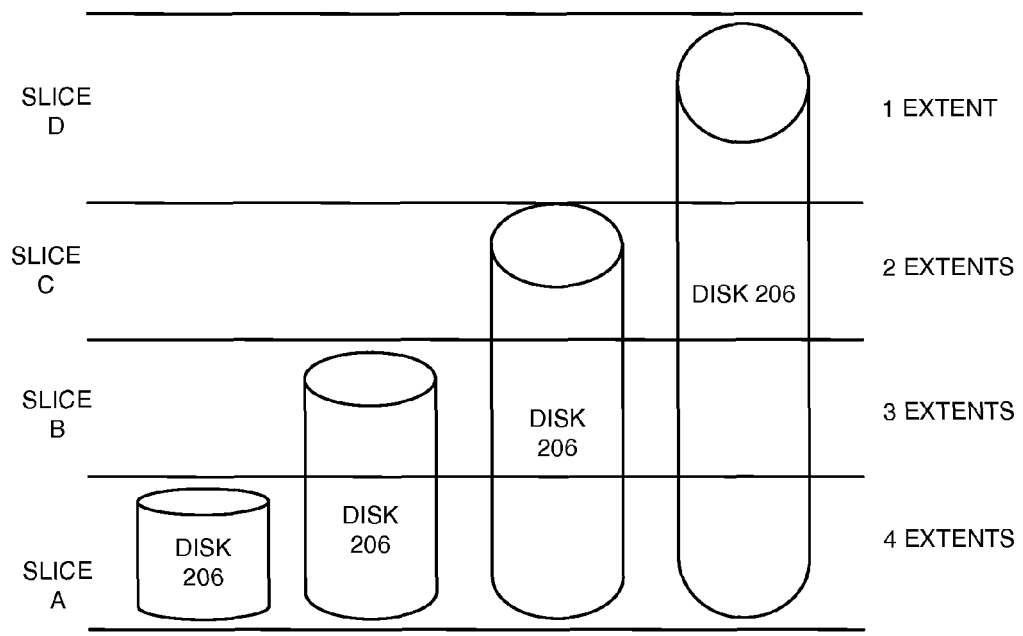
FIG. 3 shows an exemplary internal configuration of drives that are provisioned with multiple slices across extents of drives in a storage device.

FIG. 3 illustrates an example of how the controller 202 may migrate its internal configuration for drives 206, when they are of different sizes. In general, the controller 202 may employ the same basic migration paths described. However, the controller 202 may first determine the number of storage slices that are available across the drives 206 and how many extents in each of drives 206 are available.

In the embodiments, the controller 202 is thus capable of migrating drives even if they have different sizes. In particular, when drives of different sizes are used, the controller 202 may first determine which of the drives has the smallest capacity. The smallest capacity drive then determines the first slice of storage that is available across all of drives 206. As shown in FIG. 3, a slice A is provided to illustrate this concept. As also shown, for slice A, each of drives 206 is provisioned with corresponding extents for the slice A. Depending on the protection setting, the controller 202 will then configure slice A as either a 4 extent, RAID 0 volume (for a maximum capacity setting) or a 4 extent, RAID 5 volume (for a maximum capacity setting). Controller 202 then repeats this process iteratively to determine available slices across the drives. For example, as shown in FIG. 3, the controller 202 has provisioned slices B and C across the drives 206. Slice B comprises 3 extents that are configured as a RAID 0 volume (for a maximum capacity setting) or a RAID 5 volume (for a maximum protection setting). Likewise, slice C may comprise 2 extents configured as a RAID 0 volume (for a maximum capacity setting) and a RAID 1 volume (for a maximum protection setting). Finally, slice D may be included as a single extent JBOD (for a maximum capacity setting) or as an unused portion (for a maximum protection setting). Of note, the controller 202 will continue to externally present the multiple drives 206 as a single logical volume to the clients 106 even though internally the controller 202 has migrated and/or created multiple volumes internally on the drives 206. The logical volume presented may change to indicate a change in size to reflect capacity that has been added to the storage device 102.

If a drive of a redundant volume fails or a new replacement drive is inserted, the controller 202 may employ a similar process. In particular, when the new drive is added, the controller 202 will first rebuild the internal volume using the RAID data available from the other drives. Next, the controller 202 will then determine if the new drive has capacity available as an extent for one or more additional slices. If so, the controller 202 may then migrate the internal configuration of drives 206 as described above.

Figure 4:
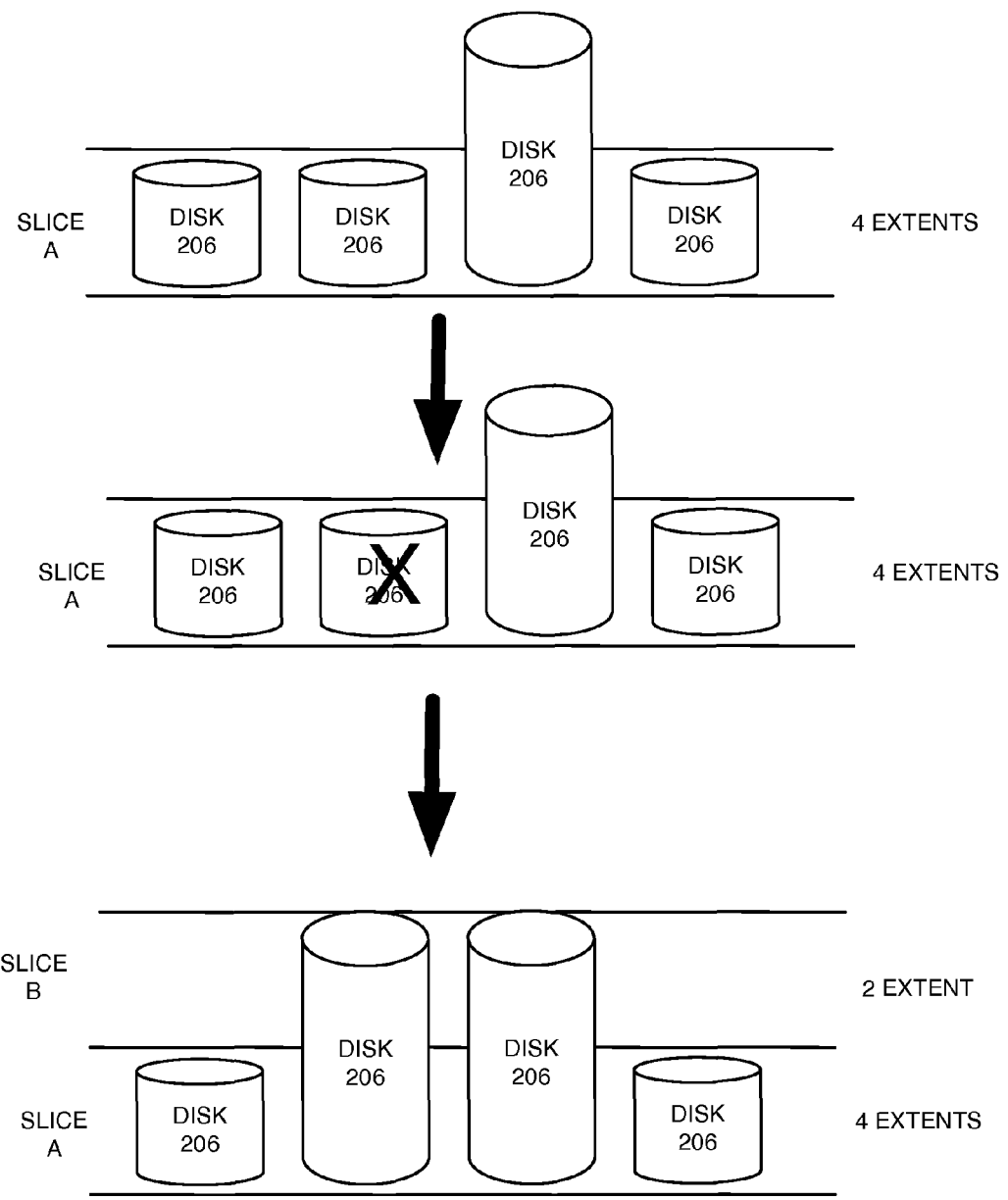
FIG. 4 illustrates an exemplary process of rebuilding and migrating an internal configuration of drives in response to a drive failure.

For purposes of illustration, FIG. 4 illustrates a process of migrating the internal configuration of the drives 206 in response to a drive failure. In the example shown, the storage device 102 initially comprises four drives 206. In this example, the controller 202 has provisioned a single slice A with 4 extents as either a RAID 0 array (for a maximum capacity setting) or a RAID 5 array (for a maximum protection setting). Furthermore, in the example shown, it is assumed that slice A has been configured as a RAID 5 array and that an extent of one of drives 206 is initially unused.

Next, as shown, one of the drives 206 has failed (as indicated by an "X"). Accordingly, the failed drive 206 has been replaced with a new drive 206. In addition, however, the new drive 206 has a larger capacity.

Accordingly, the controller 202 will first rebuild the volume of slice A, for example, using the RAID data form the other drives. In addition, the controller 202 may create a second volume (RAID 1) from the two extents of slice B. Depending on the protection setting, the controller 202 may then create another internal volume for slice B, for example, as a RAID 0 array (for a maximum capacity setting) or a RAID 1 (for a maximum capacity setting). Furthermore, the controller 202 may externally present a logical volume with a larger size corresponding the size available in slice B to the clients 106.

Figure 5:
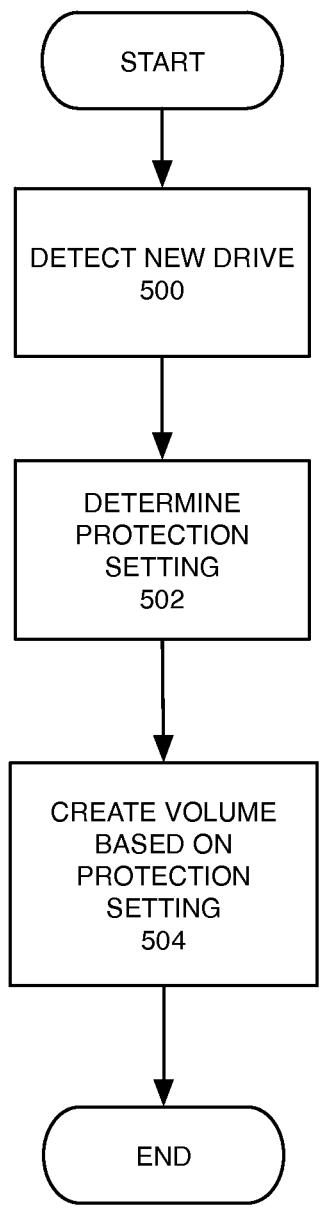
FIG. 5 illustrates an exemplary process flow of creating a volume in response to addition of a new drive to a storage device.

FIG. 5 illustrates an exemplary process flow of creating a volume in response to addition of a new drive to a storage device. In stage 500, the controller 202 may detect when a new drive 206 has been added to the storage device 102. For example, the controller 202 may recognize a signal from the storage interface 204 that indicates a new drive 206 has been connected.

In stage 502, the controller 202 then determines the relevant protection setting desired by the user. As noted above, in one embodiment, the protection setting is a simplified setting that is selected by the user to indicate a desired objective for the storage device 102. For example, the protection setting may simply offer two settings, such as "Maximum Capacity" to indicate the user's desire to have maximum storage provided by the device 102, and "Maximum Protection" to indicate the user's desire to have the device 102 protect the data, e.g., using RAID protections.

In stage 504, the controller 202 creates one or more volumes based on the protection to incorporate the storage space made available by the new drive 206. For example, as noted above, the controller 202 may create a volume in accordance with the table shown above.

Figure 6:
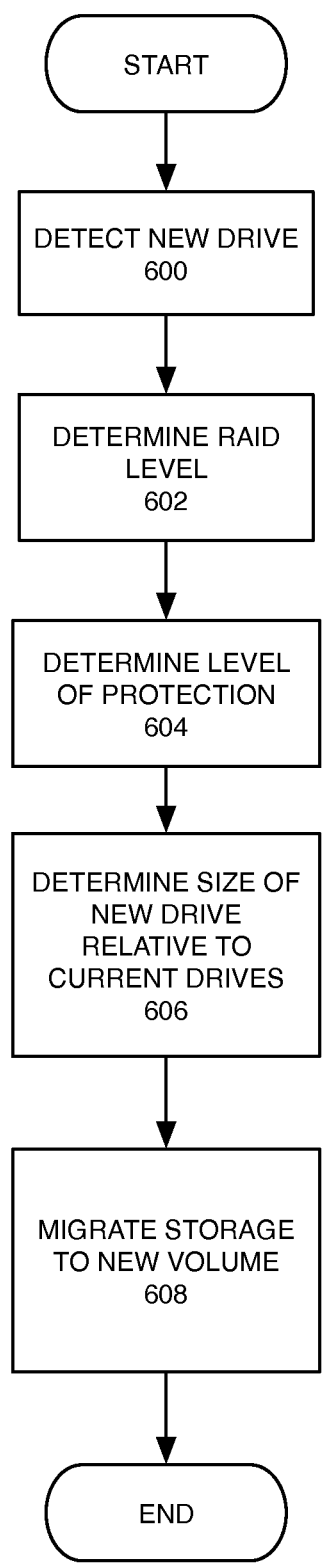
FIG. 6 illustrates an exemplary process flow of migrating storage in response to addition of a new drive to a storage device.

FIG. 6 illustrates an exemplary process flow of migrating storage in response to addition of a new drive to a storage device. In stage 600, the controller 202 may detect when a new drive 206 has been added to the storage device 102. For example, the controller 202 may recognize a signal from the storage interface 204 that indicates a new drive 206 has been connected.

In stage 602, the controller 202 then determines a RAID level for the new storage made available by the new drive 206. For example, referring to the same example shown in FIG. 4, the storage device 102 initially comprised 4 drives 206. The controller 202 then provisioned a single slice A with 4 extents as either a RAID 0 array (for a maximum capacity setting) or a RAID 5 array (for a maximum protection setting). Other examples will be apparent to those skilled in the art.

In stage 604, the controller 202 then determines the relevant protection setting desired by the user. As noted above, in one embodiment, the protection setting is a simplified setting that is selected by the user to indicate a desired objective for the storage device 102. In one embodiment, the storage device 102 offers two simplified protection settings, such as Maximum Capacity or Maximum Protection.

In stage 606, the controller 202 determines the size of the new drive 206 relative to the other current drives 206. For example, in one embodiment, the controller 202 may first determine which of the drives has the smallest capacity. The smallest capacity drive then determines the first slice of storage that is available across all of drives 206. The controller 202 may repeat this process for all extents of the drives 206 to determine how to configure various slices that are available now with the addition of the new drive 206.

In stage 608, the controller 202 migrates the new set of drives 206 to new volumes. For example, as noted above, the controller 202 may create a volume in accordance with the table shown above.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of creating a volume within a storage device, said method comprising:
   receiving user input selecting one of a finite number of protection settings for a storage device, the user input being provided using a mechanical switch on an enclosure of the storage device having a finite number of positions, each of the finite number of positions corresponding to a different one of the finite number of protection settings;
   detecting insertion of a drive into the enclosure of the storage device;
   selecting a redundancy configuration of a plurality of different redundancy configurations based on both:
      the user-selected protection setting; and
      a number of drives associated with the storage device, the drives associated with the storage device including the inserted drive; and
   creating, automatically by the storage device, a volume according to the selected redundancy configuration, the volume comprising at least part of the inserted drive.

2. The method of claim 1, wherein creating the volume comprises:
   when the number of drives is determined to be one, creating, automatically by the storage device, a volume of a first redundancy type using the drives associated with the storage device based on the user-selected protection setting;
   when the number of drives is determined to be two, creating, automatically by the storage device, a volume of a second redundancy type using the drives associated with the storage device based on the user-selected protection setting; and
   when the number of drives is determined to be greater than two, creating, automatically by the storage device, a volume of a third redundancy type using the drives associated with the storage device based on the user-selected protection setting.

3. The method of claim 2, wherein:
   when the user-selected protection setting is a maximum protection setting, the first redundancy type is a joined body of disks (JBOD) scheme, the second redundancy type is a redundant array of independent disks (RAID) 1 scheme, and the third redundancy type is a RAID 5 scheme; and
   when the user-selected protection setting is a maximum capacity protection setting, the first redundancy type is a JBOD scheme, and the second and third redundancy types are RAID 0 schemes.

4. The method of claim 1, wherein creating the volume comprises configuring a plurality of drives as a redundant array of independent disks (RAID) 1 volume when two drives have been inserted into the storage device enclosure and the protection setting that the storage device is set to is a maximum protection setting.

5. The method of claim 1, wherein creating the volume comprises configuring a plurality of drives as a redundant array of independent disks (RAID) 5 volume when at least three drives have been inserted into the storage device enclosure and the protection setting that the storage device is set to is a maximum protection setting.

6. The method of claim 1, wherein the finite number of protection settings consists of two settings.

7. The method of claim 6, wherein one of the two protection settings is a maximum capacity setting that instructs the storage device to maximize capacity of a logical volume presented to a user.

8. The method of claim 6, wherein one of the two protection settings is a maximum protection setting that instructs the storage device to maximize the redundancy of a logical volume presented to a user.

9. The method of claim 1, further comprising:
   receiving a user input requesting a change to the protection setting that the storage device is set to; and
   migrating, without requiring further user input, a configuration of the volume based on the user input.

10. The method of claim 1, further comprising:
    detecting insertion of an additional drive into the storage device enclosure; and
    migrating, without requiring further user input, a configuration of the volume based on the additional drive.

11. The method of claim 1, further comprising:
    determining a size of the inserted drive relative to other drives of the drives associated with the storage device;
    determining which drive of the drives associated with the storage device has the smallest capacity;
    determining a number of extents available across the drives associated with the storage device based on the drive having the smallest capacity;
    performing said creating the volume at least in part by configuring the volume to include a single extent of each of the drives associated with the storage device; and
    creating an additional volume including a single extent of each of the drives associated with the storage device except for the drive that has the smallest capacity.

12. The method of claim 1, further comprising:
    detecting an available capacity of at least one of the drives associated with the storage device; and
    migrating, without requiring user input, a configuration of the volume based on the available capacity of the at least one of the drives associated with the storage device.

13. A method of migrating data, said method comprising:
    receiving user input selecting one or a finite number of protection settings for a storage device, the user input being provided using a mechanical switch on an enclosure of the storage device having a finite number of positions, each of the finite number of positions corresponding to a different one of the finite number of protection settings;
    detecting insertion of a drive into the enclosure of the storage device;
    determining a redundant array of independent disks (RAID) level of protection based on both:
       the user-selected protection setting; and
       a number of drives associated with the storage device enclosure, the drives associated with the storage device enclosure including the inserted drive;
    determining a size of a volume provided by the storage device;
    determining a size of the inserted drive relative to other drives of the drives associated with the storage device enclosure; and
    migrating at least a portion of storage provided by the inserted drive to a new volume based on the user-selected protection setting and the size of the inserted drive relative to the other drives of the drives associated with the storage device enclosure.

14. The method of claim 13, further comprising migrating, without user interaction, at least a portion of storage provided by the inserted drive to at least one volume with a higher RAID level of protection based on the RAID level of protection, the user-selected protection setting, and the size of the inserted drive relative to the other drives associated with the storage device enclosure.

15. The method of claim 14, further comprising:
determining storage available for the at least one volume with the higher RAID level of protection.

16. The method of claim 13, further comprising:
detecting a failure of one of the drives associated with the storage device enclosure;
detecting insertion of a new drive that replaces the failed drive; and
rebuilding the new volume in response to the insertion of the new drive and based on a size of the new drive and the number of drives associated with the storage device enclosure.

17. The method of claim 13, further comprising:
migrating at least a portion of storage provided by the inserted drive to a RAID 5 level of protection when the storage device enclosure has at least three drives associated therewith and based on the user-selected protection setting.

18. A network attached storage device comprising:
an enclosure having a mechanical switch associated therewith that has a finite number of physical positions, each of the finite number of positions corresponding to a different data protection setting;
one or more drives inserted into the enclosure; and
a controller configured to:
detect insertion of an additional drive into the enclosure, the additional drive and the one or more drives collectively comprising a set of drives associated with the enclosure;
receive user input selecting one of the different protection settings, each of the different protection settings corresponding to multiple different redundancy configurations based on a number of the set of drives associated with the enclosure;
determine a redundancy configuration of the network attached storage device based on the user-selected protection setting and the number of the set of drives associated with the enclosure; and
automatically create a volume comprising the set of drives using the redundancy configuration.

19. The network attached storage device of claim 18, wherein the controller is further configured to maximize storage capacity of the volume when the user-selected protection setting is a first level.

20. The network attached storage device of claim 19, wherein the controller is further configured to store data in the volume in a redundant fashion when the user-selected protection setting is a second level.

21. The network attached storage device of claim 18, wherein the controller is further configured to:
detect insertion of a new drive into the enclosure of the network attached storage device; and
determine a new redundancy configuration based on a new number of drives associated with the enclosure including the new drive.

22. The network attached storage device of claim 21, wherein the controller is further configured to:
determine a size of the new drive relative to the set of drives; and
migrate the network attached storage device to at least one volume with a higher redundant array of independent disks (RAID) level of protection based on the new redundancy configuration, the user-selected protection setting, and the size of the new drive.

23. The network attached storage device of claim 18, wherein the controller is further configured to:
detect a failure in one of the set of drives;
detect addition of a new drive that replaces the failed drive; and
rebuild the volume in response to the addition of the new drive and based on a size of the new drive and a number of drives currently within the network attached storage device enclosure.

24. The network attached storage device of claim 18, wherein the controller is further configured to migrate the network attached storage device to a redundant array of independent disks (RAID) 5 level of protection when the set of drives comprises at least three drives and based on the user-selected protection setting.

* * * * *